United States Patent
Iwata

(10) Patent No.: US 7,712,856 B2
(45) Date of Patent: May 11, 2010

(54) PATTERN FORMATION METHOD, LIQUID DROPLET EJECTION APPARATUS AND ELECTRO-OPTICAL DEVICE

(75) Inventor: Yuji Iwata, Suwa (JP)

(73) Assignee: Seiko Epson Corporation (JP)

( * ) Notice: Subject to any disclaimer, the term of this patent is extended or adjusted under 35 U.S.C. 154(b) by 751 days.

(21) Appl. No.: 11/626,410

(22) Filed: Jan. 24, 2007

(65) Prior Publication Data

US 2007/0195118 A1     Aug. 23, 2007

(30) Foreign Application Priority Data

Feb. 22, 2006    (JP)    ............................ 2006-044862

(51) Int. Cl.
*B41J 29/38* (2006.01)
(52) U.S. Cl. .......................................... 347/12; 347/41
(58) Field of Classification Search ................... 347/12, 347/15, 40, 41, 43; 438/21, 28, 274, 589; 349/106, 155, 156
See application file for complete search history.

(56) References Cited

U.S. PATENT DOCUMENTS 7,393,081 B2 *   7/2008   Maekawa et al. ............. 347/40
7,497,539 B2 *   3/2009   Kwon et al. .................. 347/15

FOREIGN PATENT DOCUMENTS

| JP | 2004-145090 | 5/2004 |
|----|-------------|--------|
| JP | 2005-131498 | 5/2005 |

* cited by examiner

*Primary Examiner*—Lamson D Nguyen
(74) *Attorney, Agent, or Firm*—Harness, Dickey & Pierce, P.L.C.

(57) ABSTRACT

A pattern formation method for forming a pattern by ejecting a liquid droplet of a pattern forming material in a pattern formation region of a substrate includes: ejecting the liquid droplet at an outer periphery of the pattern formation region in an ejection direction directing from an inside of the pattern formation region toward an outside thereof when viewed from a normal line direction of the substrate.

10 Claims, 7 Drawing Sheets

PATTERN FORMATION METHOD, LIQUID DROPLET EJECTION APPARATUS AND ELECTRO-OPTICAL DEVICE

BACKGROUND

1. Technical Field

The present invention relates to a pattern formation method, a liquid droplet ejection apparatus and an electro-optical device.

2. Related Art

A process for manufacturing a display device or a semiconductor device includes many pattern formation processes in which a film pattern is formed by depositing a film on a substrate and then patterning it into a desired shape.

Recently, due to productivity improvement, that kind of pattern formation process has been using an inkjet method in which a film pattern is formed self-aligningly by ejecting and solidifying liquid droplets on a substrate. The inkjet method enables formation of a film pattern corresponding to a liquid droplet shape. Thus, the method does not require the formation of a mask for patterning, thereby reducing the number of pattern formation processes.

However, when a film pattern is formed by the inkjet method, without wet-extension of a liquid droplet landed on a substrate surface, an uneven shape of the liquid droplet reflects in a shape of the pattern. Consequently, the formed film pattern is likely to have degraded flatness and film thickness uniformity.

Thus, regarding such an inkjet method, there is provided a conventional method by spreading the wet-extension of a landed droplet (e.g. a patent document as below). In the patent document, the direction of liquid droplet ejection is tilted with respect to a normal line of a substrate, whereby a component along a counter-scanning direction on the substrate is provided to the ejected liquid droplet. In this manner, the landed liquid droplet can wet-extend along a tangential direction of the substrate by as much as an angle (tilt angle) defined by the normal line direction of the substrate and the ejection direction.

JP-A-2005-131498 is an example of related art.

Meanwhile, in the above inkjet method, typically, a liquid droplet ejection head for ejecting liquid droplets moves (for scanning) relatively with respect to the substrate to form a desired pattern. Thus, in the formation of a large film pattern, a single liquid-droplet ejection head performs line-feeding for scanning multiple times. Alternatively, a plurality of liquid-droplet ejection heads sequentially performs scanning. In other words, a pattern (individual pattern) formed by every scanning by each liquid-droplet ejection head is sequentially connected to the next to form a large film pattern.

However, liquid droplets positioned at an outer periphery (interface) of each individual pattern are evenly pulled (flown) inwardly on a corresponding pattern due to a surface tension or the like. Accordingly, the film pattern formed by sequentially connecting a plurality of individual patterns has a variation in its film thickness (line-feed streak) by as much as the outer periphery (interface) between the connected individual patterns. As a result, there arises a problem that the film pattern will have a degraded uniformity in its film thickness.

SUMMARY

The present invention has been made in order to eliminate the above problem. An advantage of the invention is to provide a pattern formation method capable of improving a film thickness uniformity of a pattern formed by liquid droplets, a liquid-droplet ejection apparatus and an electro-optical device.

According to a first aspect of the invention, a pattern formation method for forming a pattern by ejecting a liquid droplet of a pattern forming material in a pattern formation region of a substrate includes ejecting the liquid droplet at an outer periphery of the pattern formation region in an ejection direction directing from an inside of the pattern formation region toward an outside thereof when viewed from a normal line direction of the substrate.

In the pattern formation method according to the first aspect, the liquid droplet landed at the outer periphery of the pattern formation region can have a velocity component directing from the inside of the pattern formation region toward the outside thereof. Thus, a flow against a surface tension of the liquid droplet can be provided to the liquid droplet landed at the outer periphery of the pattern formation region. As a result, a film thickness uniformity of the pattern can be improved.

Furthermore, in the pattern formation method according to the above aspect, the outer periphery may be an interface between an adjacent plurality of the pattern formation regions, and the method may include ejecting the liquid droplet in an ejection direction directing from the inside of the pattern formation region toward the interface when viewed from the normal line direction of the substrate.

In this manner, the above pattern formation method can improve the film thickness uniformity of the pattern at the interface between the adjacent patterns.

Additionally, the pattern formation method may include ejecting the liquid droplet in an ejection direction having a component along the outer periphery between the pattern formation regions when viewed from the normal line direction of the substrate.

In accordance with the pattern formation method, a flow against a surface tension of the liquid droplet and a flow in a direction along the outer periphery can be provided to the liquid droplet landed at the outer periphery between the pattern formation regions. Consequently, connection between liquid droplets landed at the outer periphery can be uniformed by as much as the landed liquid droplets flow along the outer periphery. Therefore, the film thickness uniformity of the pattern can be further improved.

According to a second aspect of the invention, a liquid droplet ejection apparatus for forming a pattern by ejecting a liquid droplet of a pattern forming material in a pattern formation region of a substrate includes a liquid droplet ejection head for ejecting the liquid droplet at an outer periphery of the pattern formation region in an ejection direction directing from an inside of the pattern formation region toward an outside thereof when viewed from a normal line direction of the substrate.

In the liquid droplet ejection apparatus according to the second aspect, a liquid droplet landed at the outer periphery of the pattern formation region can have a velocity component directing from the inside of the pattern formation region toward the outside thereof. Accordingly, a flow against a surface tension can be provided to the liquid droplet, landed at the outer periphery of the pattern formation region. As a result, the film thickness uniformity of the pattern can be improved.

Furthermore, in the above liquid droplet ejection apparatus, the substrate may include an adjacent plurality of the pattern formation regions and the outer periphery may be an interface between the adjacent plurality of the pattern formation regions.

In this manner, the liquid droplet ejection apparatus can improve the film thickness uniformity of a pattern at the interface between sequential patterns.

Furthermore, the liquid droplet ejection apparatus may include a direction setting unit for setting the ejection direction by moving the liquid droplet ejection head.

In this manner, the liquid droplet ejection apparatus can eject a liquid droplet in an ejection direction set by the direction setting unit. Accordingly, regardless of configuration and size of the pattern formation region, the liquid droplet can be ejected in a desired ejection direction. As a result, the film thickness uniformity of the pattern can be reliably improved.

Furthermore, the above liquid droplet ejection apparatus may include a direction information generating unit for generating direction information relating to the ejection direction corresponding to the pattern formation region and a control device for drive-controlling the direction setting unit based on the direction information.

In this manner, the liquid droplet ejection apparatus can drive-control the direction setting unit based on the direction information corresponding to the pattern formation region. Accordingly, regardless of configuration and size of the pattern formation region, the film thickness uniformity of the pattern can be improved more reliably.

Furthermore, the above liquid droplet ejection apparatus may include a plurality of the liquid droplet ejection heads and a plurality of the direction setting units corresponding to the plurality of the liquid droplet ejection heads, wherein the direction information generating unit may generate the direction information such that the ejection directions corresponding to the plurality of the liquid droplet ejection heads intersect with each other on the substrate.

In this manner, the liquid droplet ejection apparatus can eject liquid droplets in different directions by the plurality of the liquid droplet ejection heads. Accordingly, in adjacent pattern formation regions and a plurality of different pattern formation regions, pattern formation can be performed at approximately the same timing. As a result, the film thickness uniformity of patterns can be improved without impairing productivity.

Furthermore, the above liquid droplet ejection apparatus may include a moving unit for relatively moving the substrate with respect to the liquid droplet ejection head such that the ejection direction has a component along the outer periphery of the pattern formation region.

In accordance with the liquid droplet ejection apparatus, a flow against a surface tension of the liquid droplet and a flow in a direction along the outer periphery of the pattern formation region can be provided to the liquid droplet landed at the outer periphery of the pattern formation region. Consequently, the film thickness uniformity of the pattern can be further improved.

An electro-optical device according to the aspects of the invention includes a pattern formed by the liquid droplet ejection apparatus according to the second aspect of the invention.

In this manner, the electro-optical device can have a pattern formed by liquid droplets having an improved film thickness uniformity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
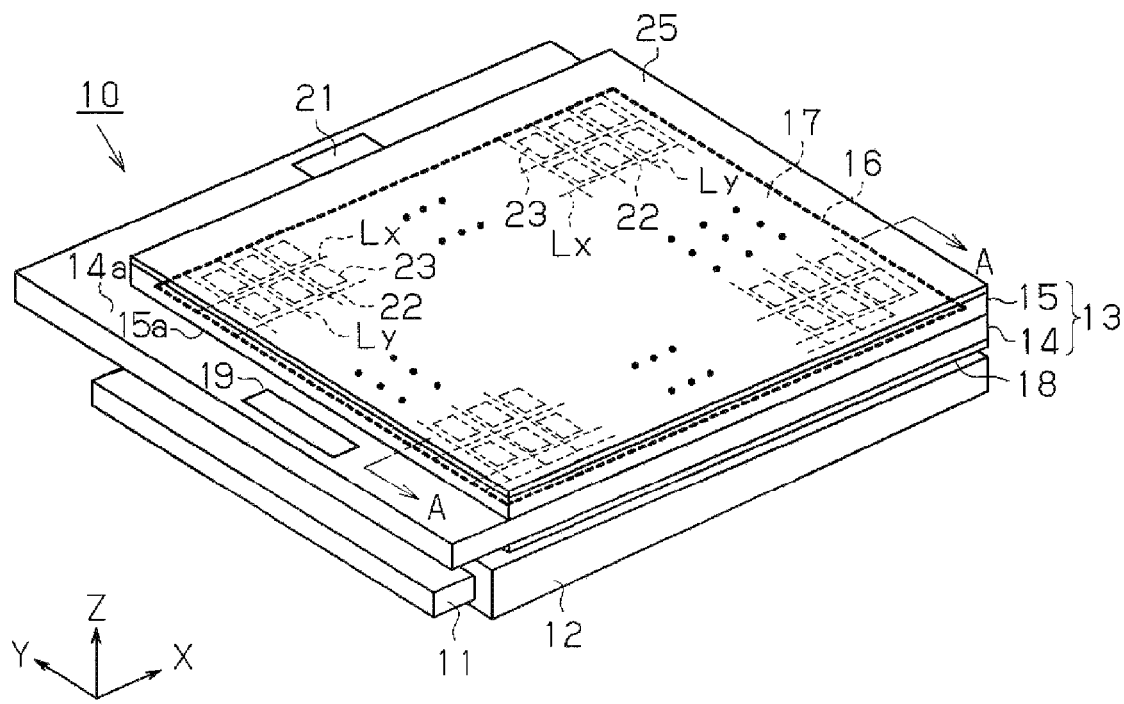
FIG. 1 is a perspective view of a liquid crystal display device according to an embodiment of the invention.
Figure 2:
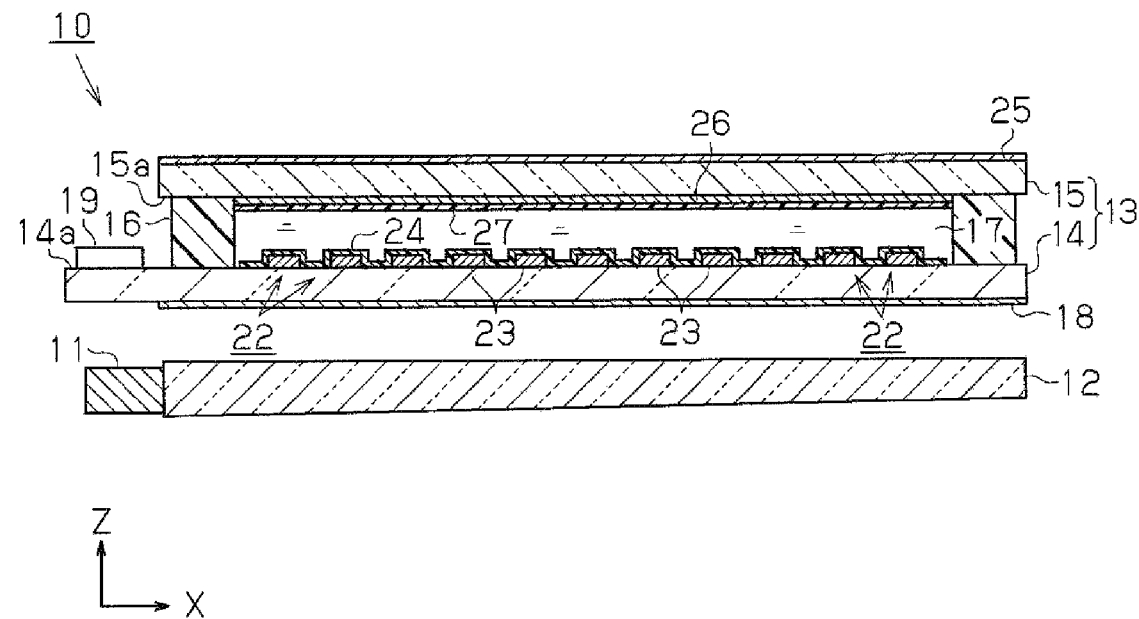
FIG. 2 is a sectional view of the above liquid crystal display device.

Hereinafter, embodiments of the invention will be described with reference to FIGS. 1 through 11. First, a description will be given of a liquid crystal display device 10 as an electro-optical device having an alignment layer formed by a pattern formation method according to an embodiment of the invention. FIG. 1 is a perspective view of a liquid crystal display device 10. FIG. 2 is a sectional view taken by line A-A shown in FIG. 1.

In FIG. 1, at a lower side of the liquid crystal display device 10, a backlight 12 is arranged that has an optical source 11 such as an LED. The backlight 12 is of an edge-light type and is formed like a square plate. Above the backlight 12, a liquid crystal panel 13 is arranged that has a square plate shape formed into approximately the same size as the backlight 12. Then, light emitted from the optical source 11 is irradiated to the liquid crystal panel 13.

The liquid crystal panel 13 includes an element substrate 14 and an opposite substrate 15, both of which are facing each other. The element substrate 14 and the opposite substrate 15 are bonded to each other via a seal member 16 made of photoreactive resin having a square frame shape, as shown in FIG. 2. Additionally, liquid crystals 17 are enclosed in a space between the substrates 14 and 15.

In FIG. 1, an optical substrate 18 such as a polarizer or a retardation film is bonded onto a lower surface of the element substrate 14 (a side surface of the backlight 12 side). The optical substrate 18 is adapted to make the light from the backlight 12 a linearly polarized light to irradiate it to the liquid crystals 17. On an upper surface of the element substrate 14 (a side surface facing the opposite substrate 15 side: an element forming surface 14*a*), a plurality of scanning lines Lx is formed in array that extends over approximately the entire width of one direction (X-arrow direction). Each of the scanning lines Lx is electrically connected to a scanning-line drive circuit 19 disposed on one side of the element substrate 14, and the scanning-line drive circuit 19 is adapted to input a scan signal to each scanning line Lx at a predetermined timing. Additionally, on the element forming surface 14*a*, a plurality of data lines Ly is formed in array that extends in approximately the entire width of a Y-arrow direction. Each of the data lines Ly is electrically connected to a data-line drive circuit 21 disposed on the other side of the element substrate 14. The data-line drive circuit 21 is adapted to input a data signal based on a display data to each data line Ly at a predetermined timing. At a place which is on the element forming surface 14a and where the scanning lines Lx intersect with the data lines Ly, a plurality of pixels 22 is formed that is connected to corresponding scanning lines Lx and data lines Ly to be aligned in a matrix shape. Each pixel 22 includes a control element which is not shown in the figure, such as a TFT, and an optically transparent pixel electrode 23 made of a transparent conductive film or the like.

In FIG. 2, an alignment layer 24 subjected to alignment treatment using a rubbing process or the like is laminated on the entire upper part of each pixel 22. The alignment layer 24 is a thin-film pattern made of a high molecular material having alignment properties, such as polyimide with alignment properties. The alignment layer 24 is adapted to set an alignment of the liquid crystals 17 to a predetermined alignment near a corresponding pixel electrode 23. The alignment layer 24 is formed by an inkjet method. Specifically, in the formation of the alignment layer 24, an alignment-layer forming material F (See FIG. 7), which is a pattern forming material obtained by dissolving a high molecular material with alignment properties into a given solvent, is used as first and second liquid droplets Fa and Fb (See FIG. 7) to be ejected on the entire upper part of each pixel 22.

On an upper surface of the opposite substrate 15, a polarizer 25 is disposed that emits a linearly polarized light perpendicular to a light from the optical substrate 18 outwardly (an upper direction in FIG. 2). On an entire lower surface of the opposite substrate 15 (a side surface facing the element substrate 14 side: an electrode formed surface 15a), an opposite electrode 26 is laminated that is comprised of an optically transparent conductive film and formed so as to be facing pixel electrodes 23. The opposite electrode 26 is electrically connected to the data line drive circuit 21, and a predetermined common potential from the data line drive circuit 21 is provided to the opposite electrode 26. On an entire lower surface of the opposite electrode 26, an alignment layer 27 is disposed that is subjected to alignment treatment using a rubbing process or the like. In the same manner as the above-described alignment layer 24, the alignment layer 27 is formed by the inkjet method and is adapted to set the alignment of the liquid crystals 17 to the predetermined alignment near the opposite electrode 26.

Then, each scanning line Lx is selected one by one at a predetermined timing based on a line progressive scanning, whereby the control element of each pixel 22 is in an ON-state only during the selecting period. Then, a data signal based on a display data from a corresponding data line Ly is output to each pixel electrode 23 corresponding to each control element. When the data signal is output to each of the pixel electrodes 23, the alignment of corresponding liquid crystals 17 is modulated based on a potential difference between each pixel electrode 23 and the opposite electrode 26. In other words, the polarization state of light from the optical substrate 18 is modulated for each pixel 22. Accordingly, depending on whether or not the modulated light passes through the polarizer 25, an image based on the display data will be displayed on an upper side of the liquid crystal panel 13.

Next, a description will be given of a liquid droplet ejection apparatus 30 used for forming the above alignment layer 27 (alignment layer 24), by referring to FIGS. 3 through 11.

Figure 3:
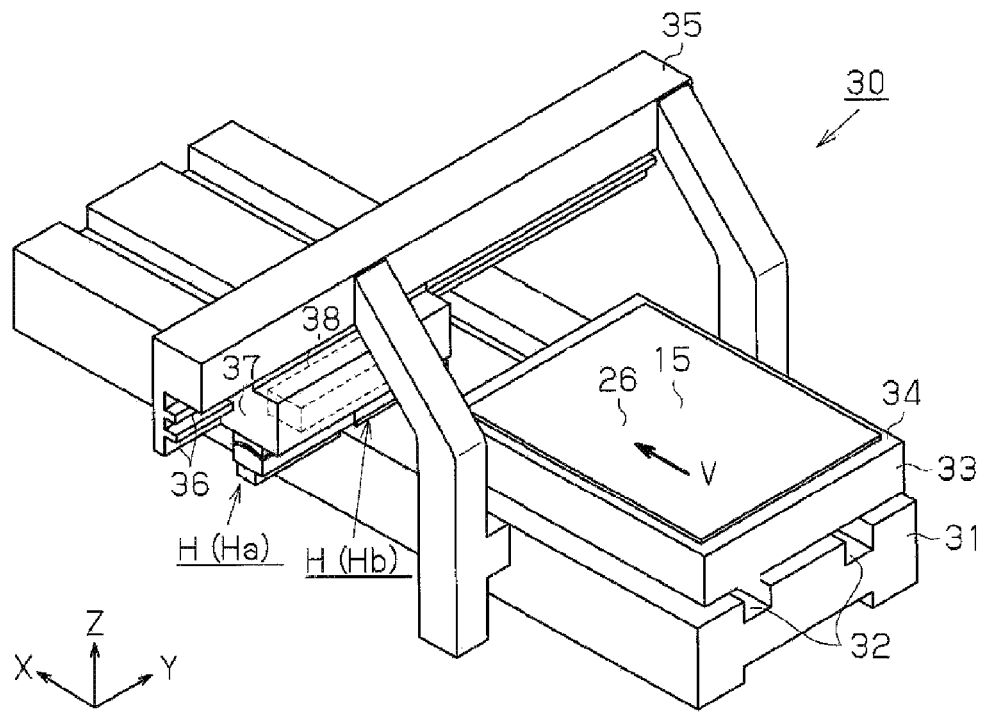
FIG. 3 is a perspective view of a liquid droplet ejection apparatus according to the embodiment.

In FIG. 3, the liquid droplet ejection apparatus 30 includes a base 31 formed in a rectangular parallelepiped shape. Additionally, on an upper surface of the base 31, a pair of guide grooves 32 is formed that extends in a longitudinal direction thereof (X-arrow direction). On the base 31 is arranged a carrying board 33. The carrying board 33 serves as a moving unit which is drive-coupled to an output shaft of an X-axis motor MX (see FIG. 11) disposed in the base 31. The carrying board 33 is adapted to reciprocate between the X-arrow direction and a counter-X-arrow direction (being carried along the X-arrow direction) at a predetermined velocity (carrying velocity V) along the guide grooves 32.

On an upper surface of the carrying board 33, a placing surface 34 for placing the opposite substrate 15 with the opposite electrode 26 thereon is formed to determine and fix a position of the opposite substrate 15 in a placed state with respect to the carrying board 33. Although the embodiment uses a structure in which the opposite substrate 15 is placed on the placing surface 34, the invention is not limited to the structure. For example, a structure may be used in which the element substrate 14 with the pixel electrodes 23 thereon is placed.

On both sides of a Y-arrow direction of the base 31 is disposed a guide member 35 formed in a gate shape. The guide member 35 has a pair of upper and lower guide rails 36 formed thereon, extending in the Y-arrow direction. In addition, the guide member 35 includes a carriage 37 which is drive-coupled to an output shaft of the Y-axis motor MY (See FIG. 11) disposed therein. The carriage 37 is adapted to reciprocate between the Y-arrow direction and a counter-Y-arrow direction along the guide rails 36 (scanning along the Y-arrow direction). Inside the carriage 37 is disposed an ink tank 38, which deliverably stores the alignment layer forming material F (See FIG. 7). Additionally, the alignment layer forming material F stored in the ink tank 38 is supplied to a pair of head units H (first and second head units Ha and Hb) mounted below the carriage 37.

Figure 4:
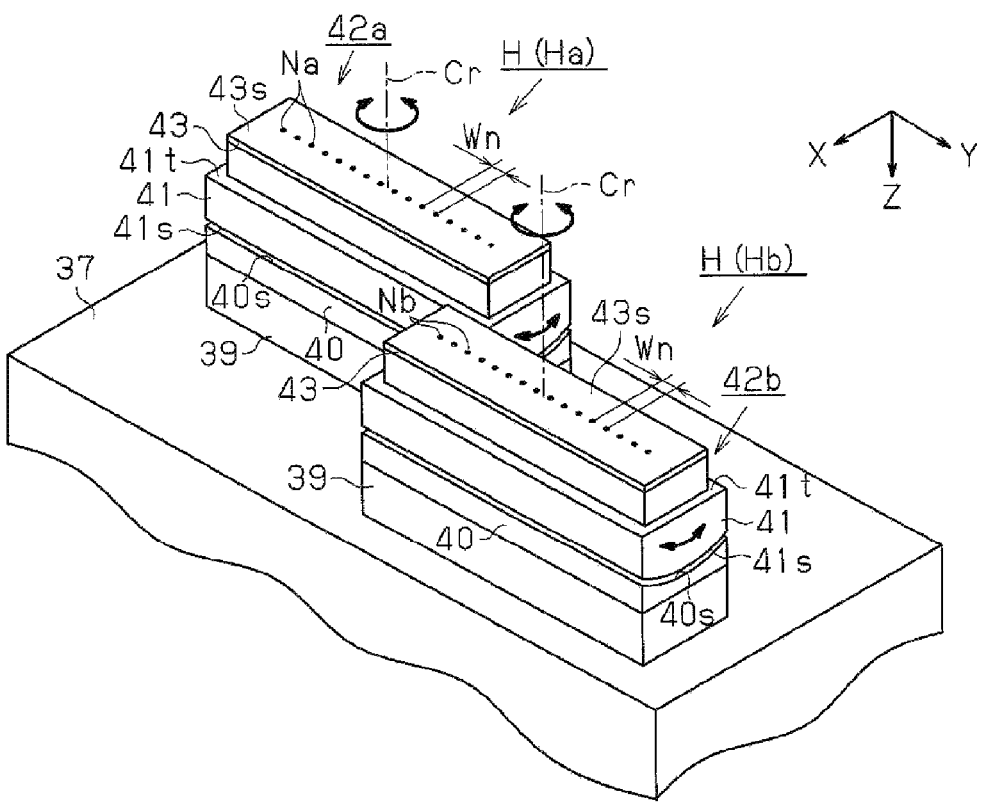
FIG. 4 is a perspective view of a liquid droplet ejection head according to the embodiment.
Figure 5:
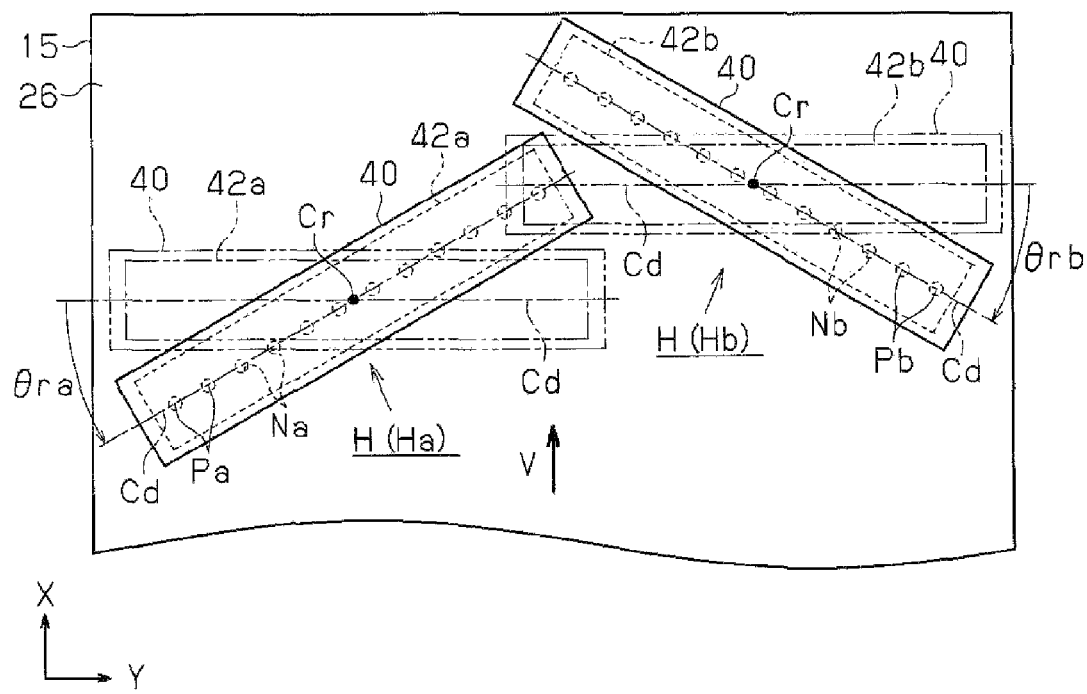
FIG. 5 is a schematic plan view of the above liquid droplet ejection head.

FIG. 4 is a schematic perspective view of the first and second head units Ha and Hb when viewed from below (opposite substrate 15). FIG. 5 is a plan view of the first and second head units Ha and Hb when viewed from the carriage 37 side.

In FIG. 4, the pair of head units H is disposed below the carriage 37 (an upper side in FIG. 4). The pair of head units H is disposed in parallel with each other when respectively viewed from the Y-arrow direction, and is arranged such that a part of them overlaps with each other when viewed from the X-arrow direction. In the embodiment, the head unit H on a counter-Y-arrow direction side is referred to as the first head unit Ha, whereas the head unit H on the Y-arrow direction side is referred to as the second head unit Hb.

The pair of head units H includes a rotation stage 39, a guide stage 40 and a tilt stage 41, in a sequential order from the carriage 37 side. In the embodiment, a direction setting unit is constituted by the rotation stage 39, the guide stage 40 and the tilt stage 41.

Each rotation stage 39 is formed into a rectangular parallelepiped shape extending in the Y-arrow direction and is coupled to an output shaft of each of rotation motors (first and second rotation motors MRa and MRb: see FIG. 11) disposed in the carriage 37. Each rotation stage 39 is adapted to receive a driving force of each corresponding rotation motor to rotate each corresponding guide stage 40 around a central axis (rotation axis Cr) along a normal line direction of the opposite substrate 15.

Each guide stage 40 is formed into a roughly rectangular parallelepiped shape corresponding to each rotation stage 39. Under the guide stage 40 (on the tilt stage 41 side), a concave curve surface (guide surface 40s) having a circular sectional shape is formed over approximately the entire width of the Y-arrow direction thereof. Each guide surface 40s is formed such that each corresponding center of curvature Cd (See FIGS. 5 and 6) is located at a position which is immediately under a corresponding guide stage 40 and which is on an upper surface of the opposite electrode 26 placed on the carrying board 33.

In the embodiment, as shown by two-dot chain lines in FIG. 5, an "initial position" is defined as a position in which each guide stage 40 is arranged and in which a corresponding center of curvature Cd (shown by each single-dot chain line in FIG. 5) is arranged in parallel with the Y-arrow direction. In addition, as shown by a solid line in FIG. 5, a "rotational position" is defined as an arranging position in which the guide stage 40 (center of curvature Cd) of the first head unit Ha rotates left by as much as a first rotation angle θra with respect to the Y-arrow direction and the guide stage 40 (center of curvature Cd) of the second head unit Hb rotates right by as much as a second rotation angle θrb with respect to the Y-arrow direction.

In FIG. 4, each tilt stage 41 is formed into a semi-cylindrical shape extending in the Y-arrow direction, as well as on the guide stage 40 side thereof, a convex curve surface (sliding surface 41s) is formed that corresponds to each guide surface 40s. In addition, a flat surface (attaching surface 41t) along the opposite substrate 15 is formed respectively, on a surface which is one side surface of each tilt stage 41 and also is a side surface (an upper surface in FIG. 4) facing to the sliding surface 41s thereof. Each tilt stage 41 is drive-coupled to an output shaft of a corresponding tilt motor (first and second tilt motors MDa and MDb: See FIG. 11) disposed in the carriage 37, as well as is adapted to receive a driving force of the corresponding tilt motor to slide (rotate) each corresponding sliding surface 41s along a corresponding guide surface 40s. Specifically, each tilt stage 41 is adapted to tilt a corresponding attaching surface 41t with respect to the opposite substrate 15, using the center of curvature Cd positioned on the opposite electrode 26 as a tilt axis such that the sliding surface 41s is flush with the guide surface 40s.

Figure 6:
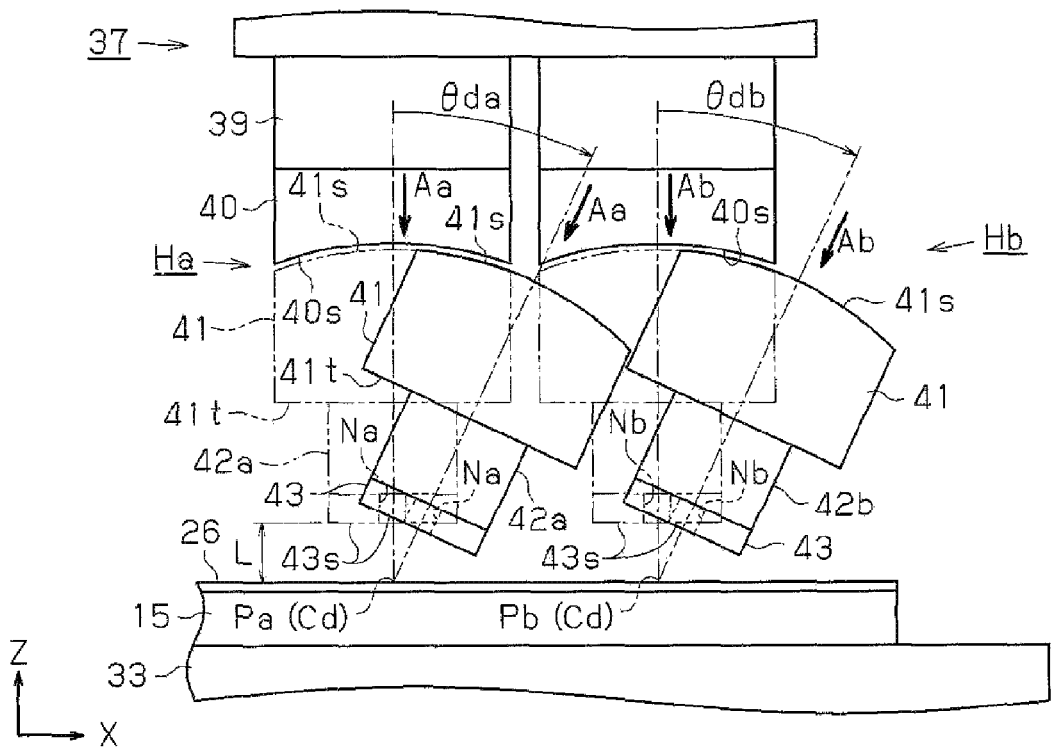
FIG. 6 is a schematic side view of the above liquid droplet ejection head.

In the embodiment, as shown by two-dot chain lines in FIG. 6, an "initial position" is defined as a position in which each tilt stage 41 is arranged and in which a normal line direction of a corresponding attaching surface 41t ("ejection direction") is arranged in parallel with a normal line direction of the opposite substrate 15 (Z-arrow direction). In addition, as shown by solid lines in FIG. 6, a "tilting position" is defined as a position in which the tilt stage 41 is arranged and in which the normal line direction of the corresponding attaching surface 41t ("ejection direction") is tilted by as much as a predetermined angle ("tilt angle") with respect to the normal line direction of the opposite substrate 15 (Z-arrow direction). In the embodiment, an "ejection direction" and a "tilt angle" corresponding to the first head unit Ha are referred to as a first ejection direction Aa and a first tilt angle θda. Additionally, an "ejection direction" and a "tilt angle" corresponding to the second head unit Hb are referred to as a second ejection direction Ab and a second tilt angle θdb.

In the embodiment, as shown in FIG. 6, when viewed from the Y-arrow direction, the tilt stages 41 of both the first and second head units Ha and Hb are adapted to tilt toward the X-arrow direction side (the carrying direction side of the opposite substrate 15) by as much as the first tilt angle θda and second tilt angle θdb, respectively.

In FIG. 4, each attaching surface 41t includes a liquid droplet ejection head (hereinafter simply referred to as an "ejection head") formed in a rectangular parallelepiped shape extending in the Y-arrow direction. In the embodiment, an ejection head corresponding to the first head unit Ha is referred to as a first ejection head 42a and an ejection head corresponding to the second head unit Hb is referred to as a second ejection head 42b.

The first ejection head 42a and the second ejection head 42b each have a nozzle plate 43 at a lower side thereof (an upper side in FIG. 4), and a nozzle forming surface 43s in parallel with a corresponding attaching surface 41t is formed on the opposite substrate 15 side (the upper side in FIG. 4) of the nozzle plate 43. On each nozzle forming surface 43s, a plurality of nozzles is formed in array at an equal distance (nozzle pitch Wn) therebetween along the Y-arrow direction. In the embodiment, a nozzle corresponding to the first head unit Ha is referred to as a first nozzle Na and a nozzle corresponding to the second head unit Hb is referred to as a second nozzle Nb.

In FIG. 6, each of the first and second nozzles Na and Nb is formed in a manner passing through a corresponding nozzle plate 43 along a normal line direction of each corresponding nozzle forming surface 43c, that is, along the first and second ejection directions Aa and Ab. Each of the first and second nozzles Na and Nb is positioned in the Z-arrow direction of a corresponding center of curvature Cd, that is, on sides opposing the first and second ejection directions Aa and Ab when each corresponding tilt stage 41 is present in the "initial position". In the embodiment, a position which is the center of curvature Cd and which is corresponding to the first ejection direction Aa of each first nozzle Na is referred to as a first landing position Pa. Additionally, a position which is the center of curvature Cd and which is corresponding to the second ejection direction Ab of each second nozzle Nb is referred to as a second landing position Pb.

Then, each tilt motor is driven to rotate in a forward direction so as to move the position of each tilt stage 41 from the "initial position" to the "tilting position". After that, each of the first and second nozzles Na and Nb, as shown in FIG. 6, tilts toward the X-arrow direction side by as much as the first and second tilt angles θda and θdb, centering around each corresponding center of curvature Cd, that is, around corresponding first and second landing positions Pa and Pb. Each of the tilting first and second nozzles Na and Nb allows each corresponding formation direction (first and second ejection directions Aa and Ab) to be tilted toward the X-arrow direction side by as much as the first and second tilt angles θda and θdb with respect to the normal line of the opposite substrate 15 (Z-arrow direction). In this situation, in the process for tilting the formation direction, the first and second nozzles Na and Nb can maintain the positions of the corresponding first and second landing positions Pa and Pb, and thus a distance between the corresponding first and second landing positions Pa and Pb can be maintained at a predetermined distance (flying distance L). In other words, the liquid droplet ejection apparatus 30, in the process changing the first and second ejection directions Aa and Ab, is adapted to be able to maintain landing accuracy of the first and second liquid droplets Fa and Fb ejected from each of the first and second nozzles Na and Nb.

Figure 7:
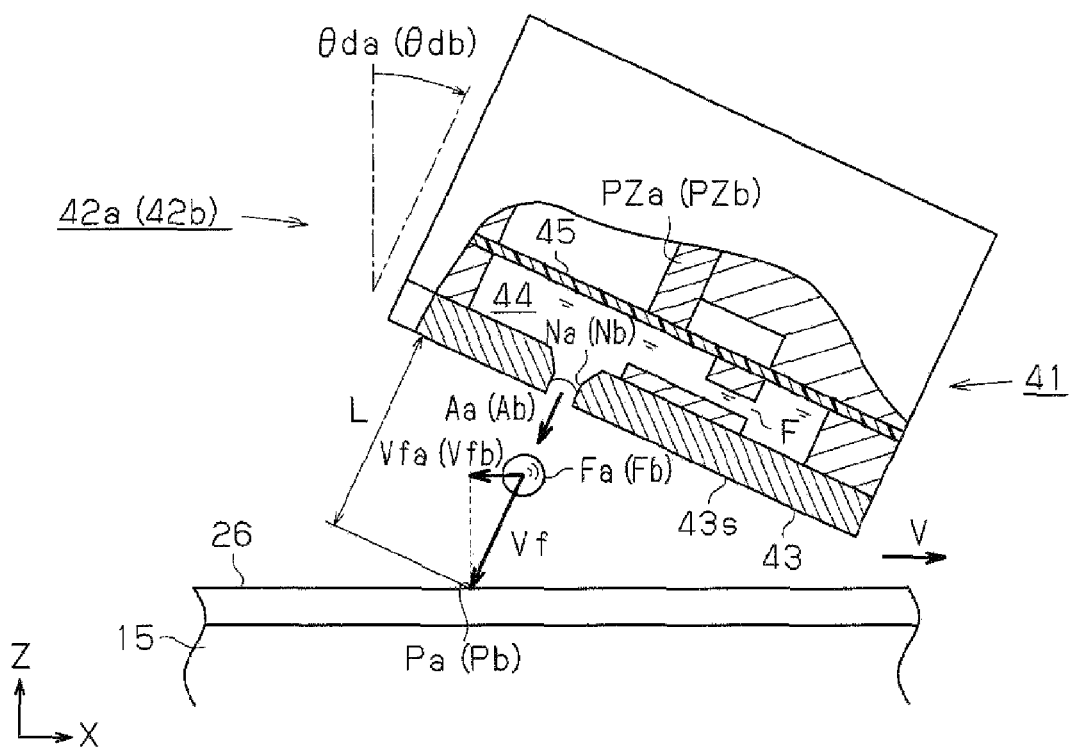
FIG. 7 is a side view of an essential part of the above liquid droplet ejection head.

In FIG. 7, each cavity 44 communicated with the ink tank 38 is formed on a side opposite to the first ejection direction Aa (second ejection direction Ab) of each first nozzle Na (second nozzle Nb), whereby the alignment layer forming material F from the ink tank 38 is supplied to a corresponding first nozzle Na (second nozzle Nb). A vibration plate 45 capable of vibrating in the first ejection direction Aa (second ejection direction Ab) and the direction opposite thereto is attached on a side opposite to the first ejection direction Aa (second ejection direction Ab) of each cavity 44 to increase or decrease the capacity of an inside of the cavity 44. A plurality of first piezoelectric elements PZa (second piezoelectric elements PZb) corresponding to each first nozzle Na (second nozzle Nb) is disposed on the vibrating plate 45. Each piezoelectric element PZa (each second piezoelectric element PZb) is adapted to receive a drive-control signal (piezoelectric element drive signal COM: See FIG. 11) to shrink or expand so as to vibrate a corresponding vibrating plate 45 in the first ejection direction Aa (second ejection direction Ab) and the direction opposite thereto. The piezoelectric element drive signal COM used in the embodiment is generated based on a waveform data WD (See FIG. 11) predetermined by a test or the like so as to vibrate a meniscus smoothly. In addition, the signal COM is determined so as to stabilize weights of the first and second liquid droplets Fa and Fb at a predetermined level.

Next, each piezoelectric element drive signal COM is supplied to each of the first and second piezoelectric elements PZa and PZb. Then, the capacity of the inside of each cavity 44 increases or decreases, thereby vibrating the meniscus (an interface of the alignment layer forming material F) in each first nozzle Na (each second nozzle Nb). When the meniscus in each first nozzle Na (each second nozzle Nb) vibrates, the alignment layer forming material F having a predetermined weight ("ejection weight") corresponding to the piezoelectric element drive signal COM is ejected from each corresponding first nozzle Na (second nozzle Nb) as the first liquid droplet Fa (second liquid droplet Fb). The ejected each first liquid droplet Fa (second liquid droplet Fb) flies along a formation direction of the first nozzle Na (second nozzle Nb), that is, along the first ejection direction Aa (second ejection direction Ab) at a predetermined velocity (ejection velocity Vf).

Figure 8:
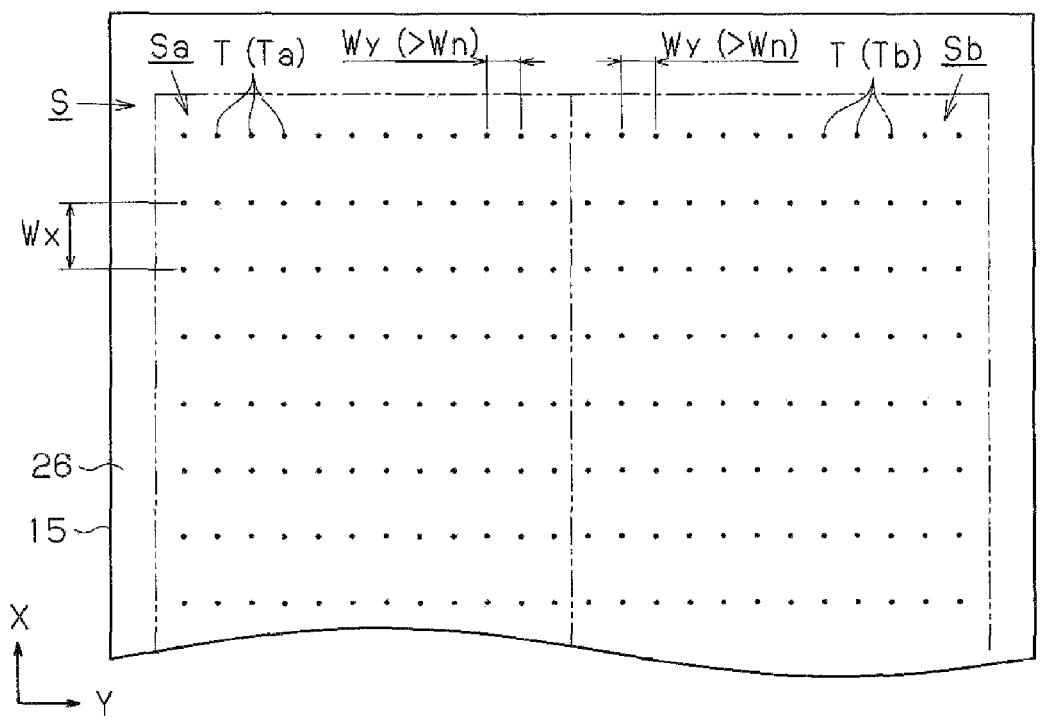
FIG. 8 is an illustrative view of a liquid droplet ejection operation.

Here, as shown in FIG. 8, a plurality of lattice points (target positions T) for landing the first and second liquid droplets Fa and Fb is arranged on a region which is on the opposite electrode 26 and where the alignment layer 27 is formed (shown by a two-dot chain line in FIG. 8: alignment layer formation region S).

More specifically, first, based on a layer thickness ("target film thickness") of the alignment layer 27 and the above-mentioned "ejection weight", a total amount of the ejected first and second liquid droplets Fa and Fb, that is, an amount of the target positions T is determined. After the determination thereof, distances between adjacent target positions T in the X-arrow direction and the Y-arrow direction (carrying pitch Wx and alignment pitch Wy) are determined such that the target positions T equivalent to the determined amount are aligned in a lattice form along the X-arrow direction and the Y-arrow direction in the alignment layer formation region S. In this situation, the alignment pitch Wy is determined so as to be shorter than a nozzle pitch Wn of the first nozzle Na (second nozzle Nb).

After the determination of the carrying pitch Wx and the alignment pitch Wy, based on the carrying pitch Wx and the alignment pitch Wy, positional coordinates of each target position T corresponding to the alignment layer formation region S are calculated. After the calculation of the positional coordinates of each target position T, among the target positions T, the target position T located on a counter-Y-arrow direction side of the alignment layer formation region S is defined as a target position T for landing each first liquid droplet Fa (first target position Ta). Conversely, among the target positions T, the target position T located on the Y-arrow direction side of the alignment layer formation region S is defined as a target position T for landing each second liquid droplet Fb (second target position T). In this way, the target positions T (first and second target positions Ta and Tb) for landing each of the first and second liquid droplets Fa and Fb are determined in the alignment layer formation region S.

In the embodiment, the region which is the alignment layer formation region S and where the first liquid droplet Fa lands is referred to as a first formation region Sa. Additionally, the region which is the alignment layer formation region S and where the second liquid droplet Fb lands is referred to as a second formation region Sb.

Figure 9:
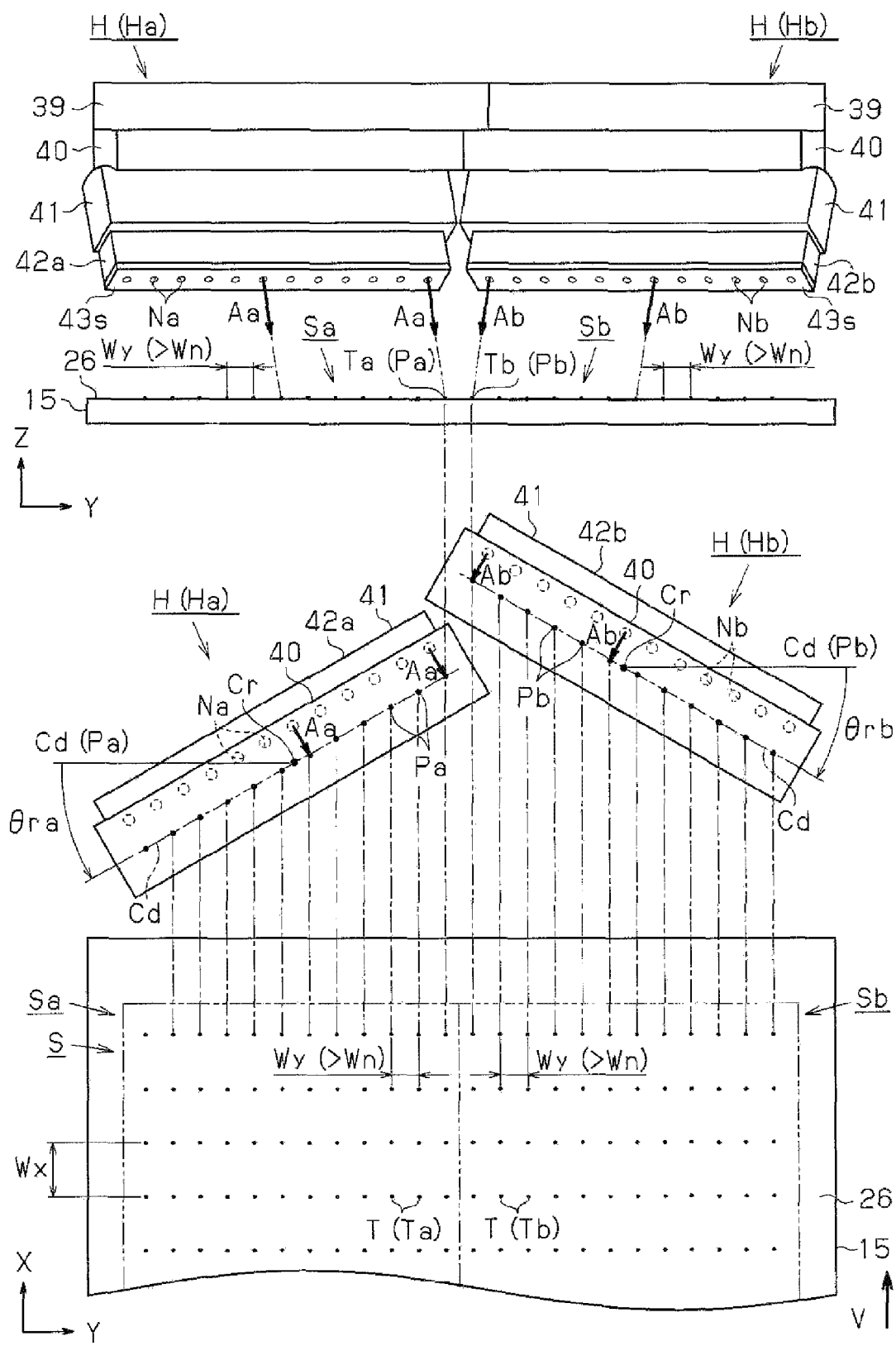
FIG. 9 is another illustrative view of the liquid droplet ejection operation.

Then, after the determination of each target position T, as shown in FIG. 9, first, the first rotation motor MRa is driven-controlled to rotate (rotate to a "rotational position") the guide stage 40 of the first head unit Ha by as much as the first rotation angle θra such that a distance between the first nozzles Na (first landing positions Pa), when viewed from the X-arrow direction, is equal to the alignment pitch Wy. In addition, the second rotation motor MRb is driven-controlled to rotate (rotate to a "rotational position") the guide stage 40 of the second head unit Hb by as much as the second rotation angle θrb such that a distance between the second nozzles Nb (second landing positions Pb), when viewed from the X-arrow direction, is equal to the alignment pitch Wy.

Sequentially, each tilt motor is driven-controlled to tilt each tilt stage 41 (tilt to a "tilting position") by as much as the first and second tilt angles θda and θdb such that the first ejection direction Aa intersects with the second ejection direction Ab on the opposite substrate 15 side when viewed from the X-arrow direction.

Thereby, when viewed from the normal line direction of the opposite substrate 15 (Z-arrow direction), the first ejection direction Aa can be directed to the second formation region Sb from the first formation region Sa. In addition, when viewed from the normal line direction of the opposite substrate 15 (Z-arrow direction), the second ejection direction Ab can be directed to the first formation region Sa from the second formation region Sb. In other words, the first liquid droplet Fa having a velocity component directing toward an outside of the first formation region Sa from thereinside can be ejected to the first target position Ta which is at an outer periphery of the first formation region Sa and which is at an outer periphery (interface) of the second formation region Sb side. Additionally, the second liquid droplet Fb having a velocity component directing toward an outside of the second formation region Sb from thereinside can be ejected to the second target position Tb which is at the outer periphery of the second formation region Sb and which is at the outer periphery (interface) of the first formation region Sa side.

Next, the opposite substrate 15 is carried in the X-arrow direction at the carrying velocity V and the piezoelectric element drive signal COM is supplied to each of the first and second piezoelectric elements PZa and PZb at a timing in which each of the first and second landing positions Pa and Pb is positioned at each of corresponding first and second target positions Ta and Tb.

Figure 10:
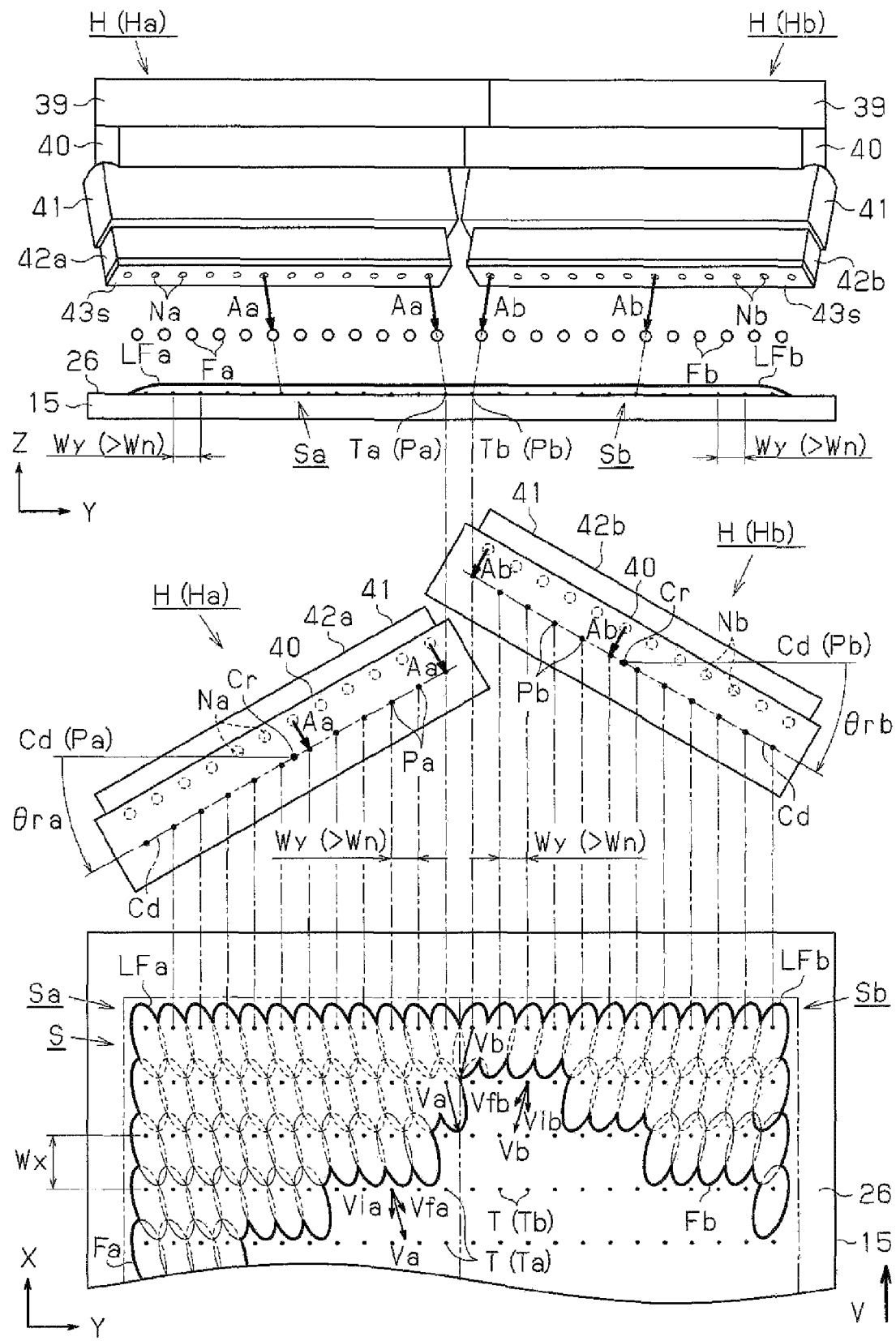
FIG. 10 is still another illustrative view of the liquid droplet ejection operation.

Then, as shown in FIG. 10, the first liquid droplet Fa from each first nozzle Na flies along the first ejection direction Aa and sequentially lands on a region of the first target position Ta (first landing position Pa). In addition, the second liquid droplet Fb from each second nozzle Nb flies along the second ejection direction Ab and sequentially lands on a region of the second target position Tb (second landing position Pb).

In this situation, each landing first liquid droplet Fa obtains a velocity component (first ejection tangent velocity Vfa) in a tangential direction of the opposite substrate 15 corresponding to the first ejection direction Aa. In addition, toward a side opposite to the carrying direction of the opposite substrate 15, each landing first liquid droplet Fa obtains a relative velocity component (first carrying tangent velocity Via) corresponding to the carrying velocity V of the opposite substrate 15. Accordingly, each landing first liquid droplet Fa will have a velocity component (first tangent velocity Va) obtained in a direction in which the first ejection tangent velocity Vfa and the first carrying tangent velocity Via are synthesized.

As a result, each first liquid droplet Fa landed on the first formation region Sa moves along the first tangent velocity Va and flows in a direction against a surface tension thereof, that is, in a direction directing from the first formation region Sa toward the second formation region Sb. Thereby, each landing first liquid droplet Fa can suppress a flow based on the surface tension (reduction in film thickness) at the outer periphery of the second formation region Sb side, and the film thickness on the second formation region Sb can be uniformed by as much as an amount of flow based on the first tangent velocity Va.

On the other hand, each landing second liquid droplet Fb obtains a velocity component (second ejection tangent velocity Vfb) in a tangential direction of the opposite substrate 15 corresponding to the second ejection direction Ab. In addition, toward the side opposite to the carrying direction of the opposite substrate 15, each landing second liquid droplet Fb obtains a relative velocity component (second carrying tangent velocity Vib) corresponding to the carrying velocity V of the opposite substrate 15. Accordingly, each landing second liquid droplet Fb will have a velocity component (second tangent velocity Vb) obtained in a direction in which the second ejection tangent velocity Vfb and the second carrying tangent velocity Vib are synthesized.

As a result, each second liquid droplet Fb landed on the second formation region Sb moves along the second tangent velocity Vb and flows in a direction against a surface tension thereof, that is, in a direction directing from the second formation region Sb toward the first formation region Sa. Thereby, each landing second liquid droplet Fb can suppress a flow based on the surface tension (reduction in film thickness) at the outer periphery of the first formation region Sa side, and the film thickness on the first formation region Sa side can be uniformed by as much as an amount of the flow based on the second tangent velocity Vb.

Therefore, a first liquid film LFa comprised of the first liquid droplet Fa and a second liquid film LFb comprised of the second liquid droplet Fb can each have uniformed film thickness at an interface between the first and second formation regions Sa and Sb. Accordingly, the alignment layer 27 formed by bonding the first and second liquid films LFa and LFb together can have an improved film thickness uniformity by as much as the film thickness uniformity of the interface region is improved.

Next, a description will be given of an electrical structure of a liquid droplet ejection apparatus 30 having the above described structure by referring to FIG. 11.

Figure 11:
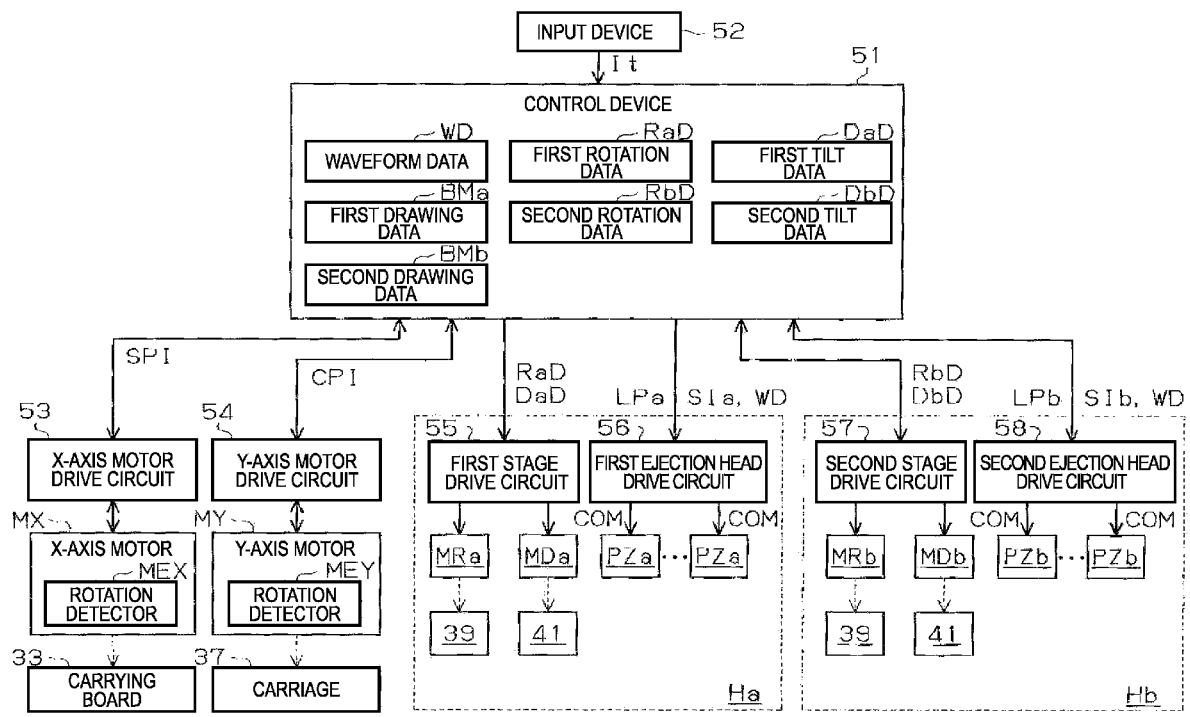
FIG. 11 is an electric block circuit diagram showing an electrical structure of the liquid droplet ejection apparatus according to the embodiment.

In FIG. 11, a control device 51 includes a CPU, a RAM, a ROM and the like constituting a control device and a direction information generating unit. In addition, in according with various data and programs stored in the RAM, ROM and the like, the control device 51 moves the carrying board 33 and allows the carriage 37 to scan, as well as drive-controls the first and second head units Ha and Hb.

The control device 51 is connected to an input device 52, an X-axis motor drive circuit 53, a Y-axis motor drive circuit 54, a first stage drive circuit 55, a first ejection head drive circuit 56, a second stage drive circuit 57 and a second ejection head drive circuit 58.

The input device 52, which has operational switches including a start-up switch and a shut-down switch, is adapted to input various operation signals to the control device 51. The input device 52 also inputs data relating to a target film thickness of the alignment layer 27 formed on the opposite substrate 15 as a film thickness data It presented in a given form to the control device 51.

Next, the film thickness data It is input from the input device 52 to the control device 51. Then, the control device 51 receives the film thickness data It from the input device 52 and calculates a total weight of the alignment layer forming material F ejected on the opposite electrode 26. In addition, the control device 51 calculates the number of the ejected first and second liquid droplets Fa and Fb, that is, the positional coordinates (carrying pitch Wx and alignment pitch Wy) of each of the first and second target positions Ta and Tb based on the calculated total weight and a weight of the first liquid droplet Fa (second liquid droplet Fb) corresponding to the waveform data WD. In this case, the alignment pitch Wy is set to be shorter than nozzle pitches Wn of the first and second nozzles Na and Nb.

Next, the control device 51, after calculating the positional coordinates of each target position T, generates and stores a first drawing data BMa and a second drawing data BMb for ejecting the first and second liquid droplets Fa and Fb at the first and second target positions Ta and Tb. Furthermore, the control device 51 generates and stores a first rotation data RaD, a second rotation data RbD, a first tilt data DaD and a second tilt data DbD, which constitute direction information.

The first and second drawing data BMa and BMb are data in which each bit value (0 or 1) corresponds to each lattice point in the alignment layer formation region S including the first and second target positions Ta and Tb. Each bit value defines an ON or OFF state of the first and second piezoelectric elements PZa and PZb. Additionally, the first drawing data BMa is defined so as to eject the first liquid droplet Fa every time the first landing position Pa is positioned at a corresponding first target position Ta. Furthermore, the second drawing data BMb is defined so as to eject the second liquid droplet Fb every time the second landing position Pb is positioned at a corresponding second target position Tb.

The first rotation data RaD and the second rotation data RbD are each equivalent to data obtained when the first rotation angle $\theta$ra and the second rotation angle $\theta$rb are defined by rotational frequencies of the first rotation motor MRa and the second rotation motor MRb, respectively. These data are generated based on an interface position between the first and second formation regions Sa and Sb and the alignment pitch Wy. In other words, the first rotation data RaD and the second rotation data RbD define the rotation frequencies of the first and second rotation motors MRa and MRb such that corresponding first and second ejection directions Aa and Ab are directed toward the interface side between the first and second formation regions Sa and Sb. Moreover, these rotation data RaD and RbD define the rotational frequencies of the first and second rotation motors MRa and MRb such that a distance between the first and second nozzles Na and Nb when viewed from the X-arrow direction is equal to the alignment pitch Wy.

The first tilt data DaD and the second tilt data DbD are equivalent to data obtained by defining the first and second tilt angles $\theta$da and $\theta$db, respectively, by rotational frequencies of the first and second tilt motors MDa and MDb. These data are generated based on the carrying pitch Wx and the alignment pitch Wy. In other words, the first and second tilt data DaD and DbD define the rotational frequencies of the first and second tilt motors MDa and MDb such that, based on a test or the like conducted in advance, major and minor axes of landed first and second liquid droplets Fa and Fb are longer than the carrying pitch Wx and the alignment pitch Wy.

The X-axis motor drive circuit 53 is adapted to respond to a drive control signal corresponding to the X-axis motor drive circuit 53 from the control device 51 to rotate the X-axis motor MX forwardly and backwardly. The motor MX allows reciprocation of the carrying board 33. A detection signal from the X-axis motor rotation detector MEX included in the X-axis motor MX is input to the X-axis motor drive circuit 53. The X-axis motor drive circuit 53, based on the detection signal from the X-axis motor rotation detector MEX, is adapted to calculate a moving direction and a moving amount of the carrying board 33 (opposite substrate 15), as well as is adapted to generate information relating to a present position of the carrying board 33 (each target position T) as substrate position information SPI. Then, the control device 51 is adapted to receive the substrate position information SPI from the X-axis motor drive circuit 53 to output various kinds of signals.

The Y-axis motor drive circuit 54 is adapted to respond to a drive control signal corresponding to the Y-axis motor drive circuit 54 from the control device 51 to rotate the Y-axis motor MY forwardly and backwardly. The motor MY allows reciprocation of the carriage 37. A detection signal from the Y-axis motor rotation detector MEY included in the Y-axis motor MY is input to the Y-axis motor drive circuit 54. Based on the detection signal from the Y-axis motor rotation detector MEY, the Y-axis motor drive circuit 54 is adapted to calculate a moving direction and a moving amount of the carriage 37 (first and second head units Ha and Hb), as well as is adapted to generate information relating to a present position of the carriage 37 as carriage position information CPI. Then, the control device 51 receives the carriage position information CPI from the Y-axis motor drive circuit 54 to output various kinds of signals.

More specifically, before the opposite substrate 15 enters immediately below the carriage 37, based on the substrate position information SPI and the carriage position information CPI, the control device 51 synchronizes a first drawing data BMa corresponding to an amount as much as the opposite substrate 15 is carried (moving forth or back) with a predetermined clock signal to generate a first ejection control signal SIa. In addition, the control device 51 synchronizes a second drawing data BMb corresponding to an amount as much as the opposite substrate 15 is carried (moving forth or back) with a predetermined clock signal to generate a second ejection control signal SIb. Then, on each scanning by the carriage 37, the control device 51 sequentially performs a serial transfer of the generated first and second ejection control signals SIa and SIb to the first and second ejection head drive circuits 56 and 58.

Furthermore, every time the first landing position Pa is positioned at the first target position Ta, the control device 51 generates a signal (first ejection timing signal LPa) for driving a corresponding first piezoelectric element PZa based on the substrate position information SPI. In addition, every time the second landing position Pb is positioned at the second target position Tb, the control device 51 generates a signal (second ejection timing signal LPb) for driving a corresponding second piezoelectric element PZb based on the substrate position information SPI. Then, the control device 51 sequentially outputs the generated first and second ejection timing signals LPa and LPb to the first and second ejection head drive circuits 56 and 58, respectively The first stage drive circuit 55 is adapted to respond to the first rotation data RaD from the control device 51 to rotate the first rotation motor MRa forwardly or backwardly. The motor MRa drives the rotation stage 39 of the first head unit Ha. In addition, the first stage drive circuit 55 is adapted to respond to the first tilt data DaD from the control device 51 to rotate the first tilt motor MDa forwardly or backwardly. The motor MDa tilts the tilt stage 41 of the first head unit Ha The first ejection head drive circuit 56 is connected to a plurality of the first piezoelectric elements PZa. The waveform data WD, the first ejection control signal SIa and the first ejection timing signal LPa from the control device 51 are supplied to the first ejection head drive circuit 56. The first ejection head drive circuit 56 is adapted to receive the first ejection control signal SIa from the control device 51 to sequentially perform a serial/parallel conversion of the first ejection control signal SIa so as to make it correspond to each first piezoelectric element PZa. Then, every time the first ejection head drive circuit 56 receives the first ejection timing signal LPa from the control device 51, the circuit 56 supplies the piezoelectric element drive signal COM based on the waveform data WD to a selected first piezoelectric element PZa, based on the first ejection control signal SIa subjected to the serial/parallel conversion. In other words, the first ejection head drive circuit 56 is adapted to supply the piezoelectric element drive signal COM to the corresponding first piezoelectric element PZa, every time each first landing position Pa is positioned at the first target position Ta.

The second stage drive circuit 57 is adapted to respond to the second rotation data RbD from the control device 51 to rotate the second rotation motor MRb forwardly and backwardly. The rotation motor MRb drives the rotation stage 39 of the second head unit Hb. In addition, the second stage drive circuit 57 is adapted to respond to the second tilt data DbD from the control device 51 to rotate the second tilt motor MDb forwardly and backwardly. The tilt motor MDb drives the tilt stage 41 of the second head unit Hb.

The second ejection head drive circuit 58 is connected to a plurality of the second piezoelectric elements PZb. The waveform data WD, the second ejection control signal SIb and the second ejection timing signal LPb from the control device 51 are supplied to the second ejection head drive circuit 58. The second ejection head drive circuit 58 is adapted to receive the second ejection control signal SIb from the control device 51 to sequentially perform a serial/parallel conversion of the second ejection control signal SIb so as to make it correspond to each second piezoelectric element PZb. Then, every time the second ejection head drive circuit 58 receives the second ejection timing signal LPb from the control device 51, the circuit 58 supplies the piezoelectric element drive signal COM based on the waveform data WD to a selected second piezoelectric element PZb, based on the second ejection control signal SIb subjected to the serial/parallel conversion. In other words, the second ejection head drive circuit 58 is adapted to supply the piezoelectric element drive signal COM to the corresponding second piezoelectric element PZb, every time each second landing position Pb is positioned at the second target position Tb.

Next, a description will be given of a method for forming the alignment layer 27 by using the liquid droplet ejection apparatus 30 described above.

First, as shown in FIG. 3, the substrate 15 is placed on the carrying board 33. In this case, the carrying board 33 is positioned on a counter-X-arrow direction side farther than the carriage 37, which is positioned at an endmost of the guide member 35 in a counter-Y-arrow direction. Additionally, each of the guide stages 40 and tilt stages 41 are positioned at the "initial position", respectively.

Starting with the above condition, the input device 52 is operated to input film thickness information It to the control device 51. Then, the control device 51 calculates the carrying pitch Wx and the alignment pitch Wy corresponding to the film thickness information It (target film thickness), that is, positional coordinates of the first and second target positions Ta and Tb. Furthermore, based on the positional coordinates of the first and second target positions Ta and Tb, the control device 51 generates and stores the first drawing data BMa and the second drawing data BMb. Additionally, based on the positional coordinates of the first and second target positions Ta and Tb, the control device 51 generates and stores the first and second rotation data RaD and RbD, as well as the first and second tilt data DaD and DbD.

After storing those data, the control device 51 moves a position of each guide stage 40 via the first and second stage drive circuits 55 and 57. Specifically, based on the first and second rotation data RaD and RbD, the control device 51 moves the position of the guide stage 40 of each of the first and second unit head units Ha and Hb from the "initial position" to the "rotational position". After moving the position of each of the guide stages 40, the control device 51 moves a position of each tilt stage 41 via the first and second stage drive circuits 55 and 57. Specifically, based on the first and second tilt data DaD and DbD, the control device 51 moves the position of the tilt stage 41 of each of the first and second head units Ha and Hb from the "initial position" to the "tilting position".

After moving the positions of each guide stage 40 and each tilt stage 41, the control device 51 drive-controls the Y-axis motor MY to move the position of the carriage 37 such that each of the first and second landing positions Pa and Pb is positioned on a route of each of corresponding first and second target positions Ta and Tb when the opposite substrate 15 is carried in the X-arrow direction.

In this way, the control device 51 sets the first ejection direction Aa so as to be directed from the inside of the corresponding first formation region Sa toward the adjacent second formation region Sb side. In addition, the control device 51 sets the second ejection direction Ab so as to be directed from the inside of the corresponding second formation region Sb toward the adjacent first formation region Sa side.

After setting the first and second ejection directions Aa and Ab, the control device 51 drive-controls the X-axis motor MX to start scanning of the carrying board 33 (opposite substrate 15) in the X-arrow direction.

In this case, the control device 51 synchronizes the waveform data WD with a predetermined clock signal to output it to the first and second ejection head drive circuits 56 and 58. Additionally, the control device 51 synchronizes the first and second drawing data BMa and BMb corresponding to an amount of scanning of the opposite substrate 15 with a predetermined clock signal to generate the first ejection control signal SIa and the second ejection control signal SIb, respectively. Furthermore, the control device 51 performs a serial transfer of the generated first and second ejection control signals SIa and SIb to the first and second ejection head drive circuits 56 and 58, respectively.

Then, based on the substrate position information SPI and the carriage position information CPI, the control device 51 outputs the first ejection timing signal LPa to the first ejection head drive circuit 56 every time the first landing position Pa is positioned at the corresponding first target position Ta. Additionally, the control device 51 outputs the second ejection timing signal LPb to the second ejection head drive circuit 58 every time the second landing position Pb is positioned at the corresponding second target position Tb.

After outputting the first ejection timing signal LPa, the control device 51 performs an operation for ejecting liquid droplets based on the first ejection control signal SIa.

In other words, every time the first landing position Pa is positioned at the corresponding first target position Ta, the control device 51 supplies the piezoelectric element drive signal COM to a corresponding first piezoelectric element PZa to allow ejection of the first liquid droplet Fa from a corresponding first nozzle Na. Each ejected first liquid droplet Fa flies to the first ejection direction Aa and sequentially lands at a corresponding first target position Ta. Each landed first liquid droplet Fa flows along a direction of the first tangent velocity Va obtained by synthesizing the first ejection tangent velocity Vfa and the first carrying tangent Via, and also flows in a direction against a surface tension thereof, that is, in a direction directing from the first formation region Sa toward the second formation region Sb. Thereby, the first liquid film LFa made of the first liquid droplet Fa can be formed in the first formation region Sa and a flow based on the surface tension (reduction in film thickness) can be suppressed on the outer periphery of the second formation region Sb side. Furthermore, the film thickness can be uniformed by as much as an amount of the flow based on the first tangent velocity Va on the second formation region Sb side of the first liquid film LFa.

Additionally, after outputting a second ejection timing signal LPb, the control device 51 performs an operation for ejecting liquid droplets based on the second ejection control signal SIb via the second ejection head drive circuit 58.

In other words, every time the second landing position Pb is positioned at the corresponding second target position Tb, the control device 51 supplies the piezoelectric element drive signal COM to a corresponding second piezoelectric element PZb to output the second liquid droplet Fb from a corresponding second nozzle Nb. Each ejected second liquid droplet Fb flies toward the second ejection direction Ab and sequentially lands at each corresponding second target position Tb. Each landed second liquid droplet Fb flows along a direction of the second tangent velocity Vb obtained by synthesizing the second ejection tangent velocity Vfb and the second carrying tangent velocity Vib, and also flows in a direction against a surface tension thereof, that is, in a direction directing from the second formation region Sb toward the first formation region Sa. Thereby, the second liquid film LFb made of the second liquid droplet Fb can be formed in the second formation region Sb and a flow based on the surface tension (reduction in film thickness) can be suppressed on the outer periphery of the first formation region Sa side. Furthermore, the film thickness can be uniformed by as much as an amount of the flow based on the second tangent velocity Vb on the first formation region Sa side of the second liquid film LFb.

Then, the film thickness can be uniformed in an interface region between the first liquid film LFa composed of the first liquid droplet Fa and the second liquid film LFb composed of the second liquid droplet Fb. Accordingly, the alignment layer 27 having an improved film thickness uniformity can be formed.

Next, a description will be given below of effectiveness of the embodiment having the above structure.

1. According to the above embodiment, the first liquid droplet Fa from the first ejection direction Aa is ejected in the first formation region Sa and then obtains a velocity component (first tangent velocity Va) directing from the inside of the first formation region Sa toward the outside thereof (second formation region Sb side). Additionally, the second liquid droplet Fb from the second ejection direction Ab is ejected in the second formation region Sb and then obtains a velocity component (second tangent velocity Vb) directing from the inside of the second formation region Sb toward the outside thereof (first formation region Sa side).

Accordingly, an outward flow against the surface tension of the first liquid droplet Fa can be provided to each first liquid droplet Fa landed at the outer periphery of the second formation region Sb side, which is also the outer periphery of the first formation region Sa. As a result, the film thickness uniformity can be improved on the second formation region Sb side of the first liquid film LFa. In addition, an outward flow against the surface tension of the second liquid droplet Fb can be supplied to each second liquid droplet Fb landed at the outer periphery of the first formation region Sa side, which is also the outer periphery of the second formation region Sb. As a result, the film thickness uniformity can be improved on the first formation region Sa side of the second liquid film LFb.

2. Additionally, the alignment layer 27 is formed by bonding the first liquid film LFa and the second liquid film LFb together. Thus, the film thickness uniformity of the alignment layer 27 can be improved.

3. According to the above embodiment, the velocity component (first and second carrying tangent velocities Via and Vib) along the outer periphery (counter-X-arrow direction) between the first and second formation regions Sa and Sb is provided to the landed first and second liquid droplets Fa and Fb. Accordingly, a flow along the outer periphery can be provided to the first and second liquid droplets Fa and Fb landed at the outer periphery between the first and second formation regions Sa and Sb. As a result, the uniformity of a film thickness along the outer periphery can be improved by as much as the first and second liquid droplets Fa and Fb flow along the outer periphery. Thereby, the alignment layer 27 can have an improved film thickness uniformity.

4. According to the above embodiment, based on the target position T corresponding to the alignment layer formation region S, the first and second rotation data RaD, RbD and the first and second tilt data DaD, DbD are generated. In addition, based on those data, the first and second ejection directions Aa and Ab are determined. Therefore, the first and second tangent velocities Va and Vb corresponding to the alignment layer formation region S (first and second formation regions Sa and Sb) can be provided to both of the first and second liquid droplets Fa and Fb. As a result, the film thickness uniformity of the alignment layer 27 can be improved more reliably.

5. According to the above embodiment, when viewed from the carrying direction (X-arrow direction) of the opposite substrate 15, the first ejection direction Aa is adapted to intersect with the second ejection direction Ab. Therefore, one time scanning of the opposite substrate 15 allows landing of both the first and second liquid droplets Fa and Fb. As a result, without damaging productivity of the alignment layer 27, the film thickness uniformity thereof can be improved.

Furthermore, the embodiment can approximately equalize the landing timings of the first and second liquid droplets Fa and Fb in the interface region. This can suppress a change in film thickness due to a difference in dryness between the first and second liquid droplets Fa and Fb. Thus, the film thickness uniformity of the alignment layer 27 can be further improved.

Meanwhile, the embodiment may be modified as follows:

1. In the above embodiment, the alignment layer 27 is formed by bonding the first liquid film LFa to the second liquid film LFb. As an alternative to this, a structure may be employed that allows formation of a pattern composed of only the first liquid film LFa or a pattern co posed of only the second liquid film LFb. In this manner, the pattern composed of at least first liquid film LFa can have an improved film thickness uniformity at the outer periphery on the first tangent velocity Va side. Alternatively, the pattern composed of the second liquid film LFb can have an improved film thickness uniformity at the outer periphery on the second tangent velocity Vb side.

2. The above embodiment employs the structure in which the first liquid droplet Fa (second liquid droplet Fb) from the first ejection direction Aa (second ejection direction Ab) is landed on the entire part of the first formation region Sa (second formation region Sb). As an alternative to this, for example, the first liquid droplet Fa (second liquid droplet Fb) from the first ejection direction Aa (second ejection direction Ab) may be landed only at a part which is the outer periphery of the first formation region Sa (second formation region Sb) and which is the outer periphery of the second formation region Sb side (first formation region Sa side).

In this manner, the film thickness uniformity can be improved only at the outer periphery of the second formation region Sb (first formation region Sa) side of the first liquid film LFa (second liquid film LFb), whereby the film thickness uniformity at the other outer peripheries can be maintained.

3. Alternatively, all of the first liquid droplets Fa (second liquid droplets Fb) ejected at the outer periphery of the first formation region Sa (second formation region Sb) may be ejected in an ejection direction directing from the inside of the first formation region Sa (second formation region Sb) toward the outside thereof. In this manner, an improved film thickness uniformity can be provided to the entire outer periphery of the first formation region Sa (second formation region Sb).

4. In the above embodiment, when viewed from the normal line direction of the opposite substrate 15, the first and second ejection directions Aa and Ab have the component obtained in the scanning direction of the carrying board 33. As an alternative to this, when viewed from the normal line direction of the opposite substrate 15, a structure may be employed in which the first and second ejection directions Aa and Ab have a component in the counter-scanning direction of the carrying board 33.

5. In the above embodiment, the piezoelectric element drive signal COM composed of the common waveform data WD is supplied to each of the first and second piezoelectric elements PZa and PZb to allow ejection of the first and second liquid droplets Fa and Fb having a designated volume. As an alternative to this, for example, a structure may be employed in which the piezoelectric element drive signal COM composed of each different waveform data WD is supplied to each of the first and second piezoelectric elements PZa and PZb to allow ejection of the first and second liquid droplets Fa and Fb having different volumes.

6. The above embodiment employs the structure including a single array of the first ejection heads 42a and a single array of the second ejection heads 42b. Alternatively, a structure may be employed that includes a plurality of arrays of the first ejection heads 42a and a plurality of arrays of the second ejection heads 42b.

7. The above embodiment employs the structure using the single first nozzle Na and the single second nozzle Nb. Alternatively, a structure may be employed that uses a plurality of the first nozzles Na and a plurality of the second nozzles Nb.

8. In the above embodiment, the pattern is embodied as the alignment layer 27 of the liquid crystal display apparatus 10. Instead of this, for example, the pattern may be embodied as each of thin films, a metallic wiring, a color filter or the like, which is disposed in the liquid crystal display apparatus 10, a field-effect device (FED), a surface-conduction electron-emitter display (SED) or the like, which takes advantage of the luminescence of fluorescent substances caused by electrons discharged from an electron-discharging element. In short, it is only necessary to use a pattern capable of being formed by landed liquid droplets.

9. In the above embodiment, the substrate is embodied as the opposite substrate 15 included in the liquid crystal display apparatus 10. Alternatively, the substrate may be embodied as a silicon substrate, a flexible substrate, a metallic substrate or the like.

10. In the above embodiment, the electro-optical apparatus is embodied as the liquid crystal display apparatus 10. Alternatively, for example, the electro-optical apparatus may be embodied as an electro-luminescence apparatus.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The entire disclosure of Japanese Patent Application No. 2006-044862, filed Feb. 22, 2006 is expressly incorporated by reference herein.

What is claimed is:

1. A pattern formation method for forming a pattern by ejecting a liquid droplet of a pattern forming material in a pattern formation region of a substrate, the method comprising:
    ejecting the liquid droplet at an outer periphery of the pattern formation region in an ejection direction directing from an inside of the pattern formation region toward an outside thereof when viewed from a normal line direction of the substrate.

2. The pattern formation method according to claim 1, wherein the outer periphery is an interface between an adjacent plurality of the pattern formation regions, the method including ejecting the liquid droplet in an ejection direction directing from an inside of each pattern formation region toward the interface when viewed from the normal line direction of the substrate.

3. The pattern formation method according to claim 2, comprising ejecting the liquid droplet in an ejection direction having a component along the outer periphery between the pattern formation regions when viewed from the normal line direction of the substrate.

4. A liquid droplet ejection apparatus for forming a pattern by ejecting a liquid droplet of a pattern forming material in a pattern formation region of a substrate, the apparatus comprising:
    a liquid droplet ejection head for ejecting the liquid droplet at an outer periphery of the pattern formation region in an ejection direction directing from an inside of the pattern formation region toward an outside thereof when viewed from a normal line direction of the substrate.

5. The liquid droplet ejection apparatus according to claim 4, wherein the substrate includes an adjacent plurality of the pattern formation regions and the outer periphery is an interface between the adjacent plurality of the pattern formation regions.

6. The liquid droplet ejection apparatus according to claim 4, comprising a direction setting unit for setting the ejection direction by moving the liquid droplet ejection head.

7. The liquid droplet ejection apparatus according to claim 6, comprising a direction information generating unit for generating direction information relating to the ejection direction corresponding to the pattern formation region and a control device for drive-controlling the direction setting unit based on the direction information.

8. The liquid droplet ejection apparatus according to claim 7, further comprising:
    a plurality of the liquid droplet ejection heads; and
    a plurality of the direction setting units corresponding to the plurality of the liquid droplet ejection heads, wherein the direction information generating unit generates the direction information such that the ejection directions corresponding to the plurality of the liquid droplet ejection heads intersect with each other on the substrate.

9. The liquid droplet ejection apparatus according to claim 4, further comprising a moving unit for relatively moving the substrate with respect to the liquid droplet ejection head such that the ejection direction has a component along the outer periphery of the pattern formation region.

10. An electro-optical device comprising a pattern formed by the liquid droplet ejection apparatus according to claim 4.

* * * * *